(12) United States Patent
Leibenguth (10) Patent No.: US 11,749,048 B2
(45) Date of Patent: Sep. 5, 2023

(54) METHOD FOR AUTHENTICATING A SECURE DOCUMENT

(71) Applicant: THALES DIS FRANCE SAS, Meudon (FR)

(72) Inventor: Joseph Leibenguth, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 94 days.

(21) Appl. No.: 17/048,724

(22) PCT Filed: Apr. 17, 2019

(86) PCT No.: PCT/EP2019/059986
§ 371 (c)(1),
(2) Date: Oct. 19, 2020

(87) PCT Pub. No.: WO2019/202027
PCT Pub. Date: Oct. 24, 2019

(65) Prior Publication Data
US 2021/0174626 A1 Jun. 10, 2021

(30) Foreign Application Priority Data

Apr. 19, 2018 (EP) .................................... 18305481

(51) Int. Cl.
*G07D 7/00* (2016.01)
*G07D 7/206* (2016.01)
*G06F 21/16* (2013.01)

(52) U.S. Cl.
CPC ........... *G07D 7/0034* (2017.05); *G06F 21/16* (2013.01); *G07D 7/206* (2017.05)

(58) Field of Classification Search
CPC ....... G07D 7/0034; G07D 7/206; G06F 21/16
(Continued)

(56) References Cited

U.S. PATENT DOCUMENTS

| 2006/0157559 A1 | 7/2006 | Levy et al. |
| 2012/0324534 A1 | 12/2012 | Mandridake et al. |
| 2013/0002713 A1 | 1/2013 | Souparis et al. |

FOREIGN PATENT DOCUMENTS

KR     20020013035 A     2/2002

OTHER PUBLICATIONS

PCT/EP2019/059986, International Search Report, dated May 8, 2019, European Patent Office, P.B.5818 Patentlaan 2 NL-2280 HV Rijswijk.

(Continued)

*Primary Examiner* — Daniel A Hess (57) ABSTRACT

The invention relates to a method for authenticating a secure document comprising data printed by analogue or digital printing, said method comprising the following operations: —definition, from among a set of graphical and/or alphanumeric data of the secure document, of at least one distinct data area including at least one distinctive pattern; —during an operation of fabrication of the secure document, reading the distinct data area onto a storage device so as to form a distinct reference data area; —in the course of an operation of verification of the authenticity of the secure document, extracting the distinct data area from a digitized version of the secure document; and—comparing the extracted distinct data area with the distinct reference data area so as to determine a level of matching between said distinct data areas and to deduce therefrom a positive authentication or negative authentication.

17 Claims, 5 Drawing Sheets

(58) Field of Classification Search
USPC .......................................................... 382/100
See application file for complete search history.

(56) References Cited

OTHER PUBLICATIONS

PCT/EP2019/059986, International Search Report, dated May 8, 2019, European Patent Office, D-80298 Munich.

METHOD FOR AUTHENTICATING A SECURE DOCUMENT

TECHNICAL FIELD

The present invention relates to a method for authenticating a secure document comprising data printed by analogue printing techniques such as offset, flexography, rotogravure, etc. or digital printing such as inkjet, laser, etc. It also relates to a system for authenticating the secure document as well as to a secure document that needs to be authenticated. The invention is useful in the field of securing documents and, in particular, of authenticating secure documents such as identity cards, driving licenses and passports.

PRIOR ART

In a manner that is known per se, security documents, such as for example identity documents, generally comprise a secure printing, referred to as artwork, as well as an identity photograph of the holder, alphanumeric data such as, for example, the name of the holder, their date of birth, height, address, the document number, the document issue date and/or the identity of the authority that issued the document.

Figure 1:
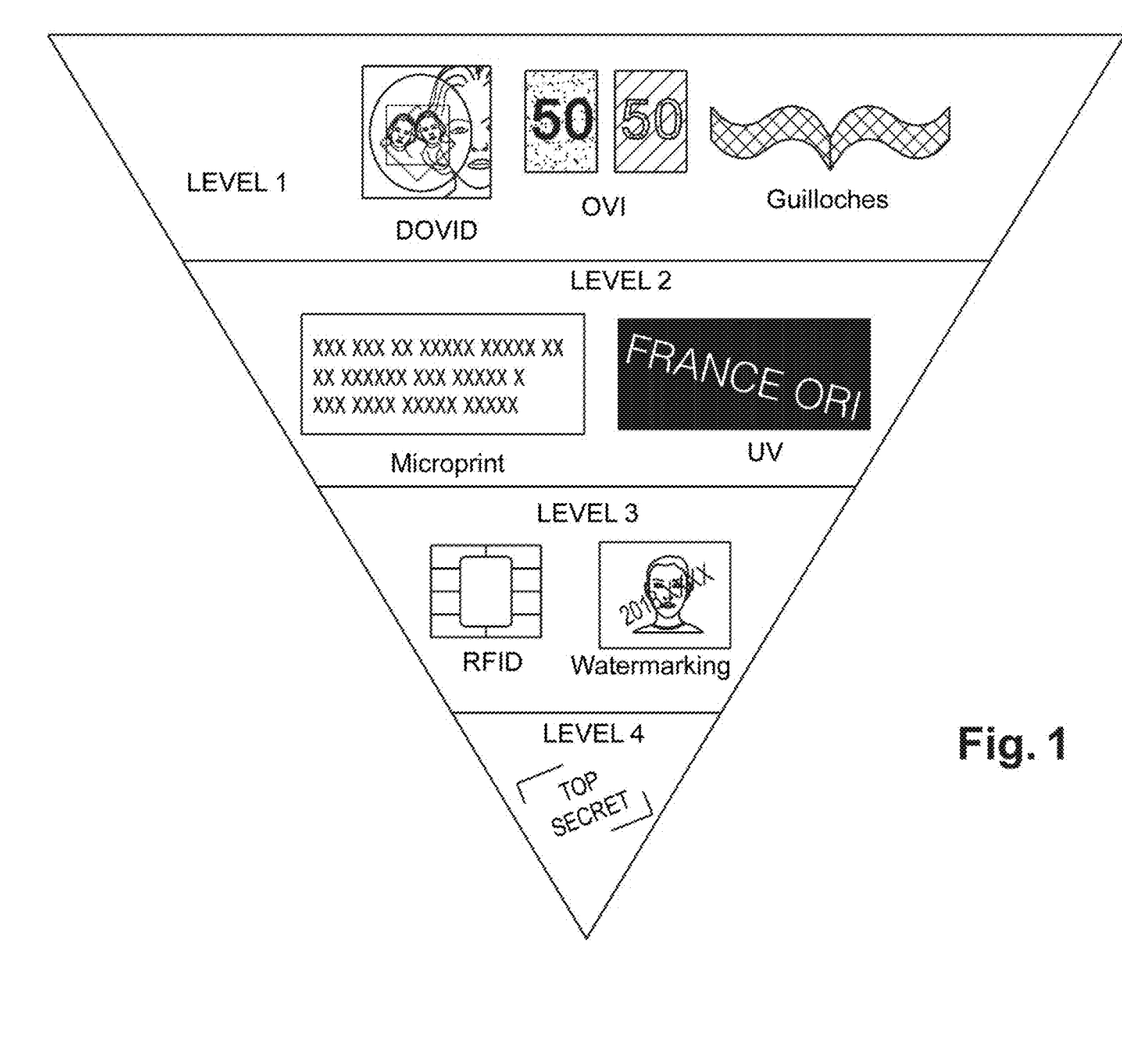
FIG. 1, already described, shows the various levels of security for secure document inspections.

To secure these identity documents, it is known to add different types of security elements providing levels of security that vary between level 1 and level 4, as shown in FIG. 1. Level 1 corresponds to a visual inspection with the naked eye by security personnel; level 2 corresponds to an inspection with a simple optical apparatus such as, for example, a magnifying glass or an ultraviolet lamp; level 3 corresponds to a verification of the data by means of sophisticated specific apparatuses; level 4 corresponds to a secret-type ultra-secure verification.

It is known, for example, for a level 1 security inspection, to associate the identity photograph with guilloches. These guilloches form a network of undulating lines, superimposed on the photograph and visible to the naked eye. The guilloches are intended for making discernible, during an identity inspection, any fraudulent modification of the photograph. They make it possible in particular to protect against modifications of the colour of the photograph, for example when adding a beard or hair.

It is furthermore known to implement means for protecting the alphanumeric data mentioned on the identity documents in order to protect them against alterations of these data such as, for example, modifications of the alphanumerical text. The protection of alphanumeric data can be obtained by watermarking techniques intended for integrating elements that are invisible to the naked eye into an identity photograph, such elements encoding predefined information. Watermarking provides security level 3 with automatic verification of the encoded data during a security inspection. Thus, using a digital processing and analysis apparatus, the identity photograph is analysed and the data that are watermarked therein are extracted. The consistency of these data is then verified. However, since the watermarking is not visible to the naked eye or using a simple optical apparatus, it does not make it possible to implement security levels 1 or 2. The verification of watermarked secure documents thus requires trained personnel, provided with considerable analysis means, which places limits on security inspections, in particular mobile inspections.

Figure 2A:
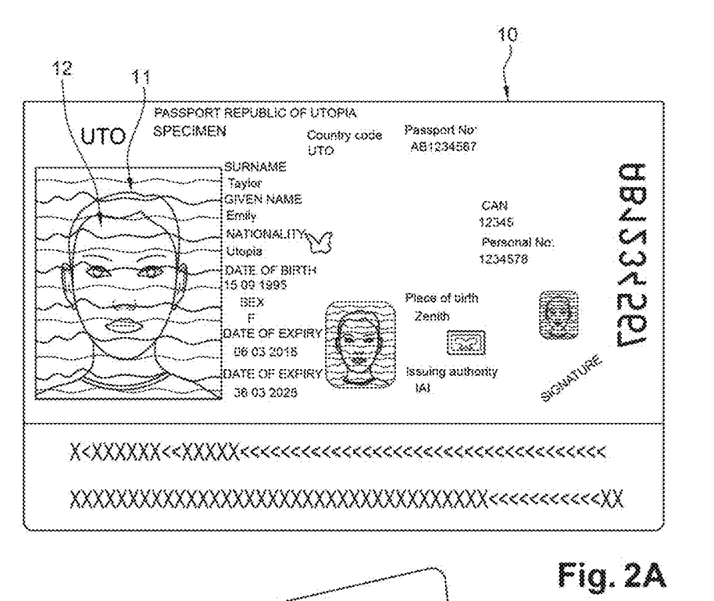
FIGS. 2A-2B, already described, show an example of one page and a set of pages, respectively, of a document secured by known security elements.
Figure 2B:
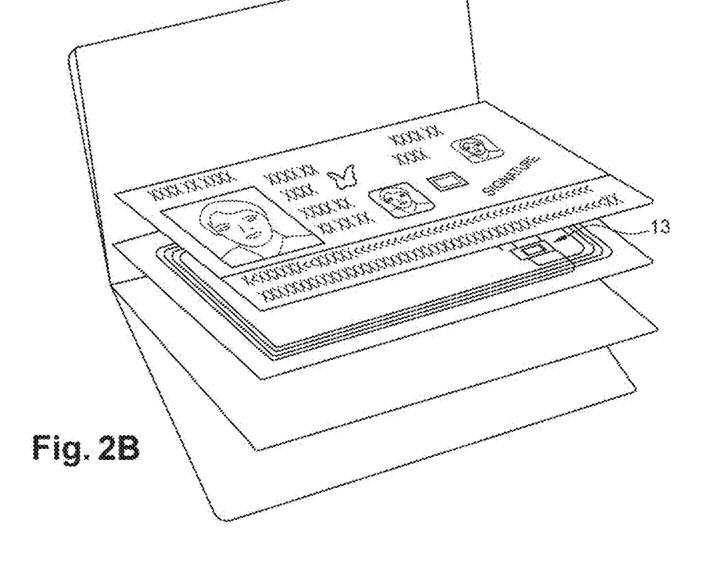

Another known technique for securing identity documents makes it possible to secure the alphanumeric data mentioned on the identity documents. This technique proposes inserting, onto the identity photograph, variable guilloches encoding all or part of the alphanumeric data. Examples of methods for securing documents using such variable guilloches are described in particular in patent applications EP 2 325 022 A1 and US 2010/0260372, filed in the name of the applicant. One example of a secure document 10, shown in FIGS. 2A-2B, comprises a photograph 11 provided with such guilloches 12. These guilloches 12, in order to be able to be extracted automatically, and thus to comply with security level 3, must be sufficiently marked. And yet, such marking of the guilloches alters the quality of the photograph and the readability of the person depicted in the photograph.

Other security techniques are likewise known, such as the inspection of optical security elements such as DOVID (Diffractive Optically Variable Image Device) holographic elements or printing with OVI (Optically Variable Ink), which offers security level 1. Still further techniques offer security level 3, such as the reading of data recorded on an RFID chip of the type represented by reference 13 in FIG. 2B, inserted into the identity document. These known techniques generally allow security level 3 or security level 1. And yet, while security level 3 is highly reliable, it generally requires trained personnel and considerable analysis means that are difficult to transport, and this leads to a high cost. Conversely, security level 1 is less expensive but has limited reliability.

Security level 2 offers a good compromise between reliability and cost. It furthermore allows for mobile inspections. However, security level 2, in particular in mobile inspections, requires the security personnel to be in possession of an adequate verification tool during all their movements. And yet, this personnel is already heavily equipped with various devices for defence and protection.

SUMMARY OF THE INVENTION

In order to respond to the above-mentioned problem of equipping security personnel required to perform level 2 mobile security inspections, the applicant proposes a method for authenticating a secure document, with security level 2 or even level 3, using a tool that can be provided in the form of a smartphone application, for example such as the smartphone's built-in camera. Indeed, with the democratisation of smartphones and the development of increasingly powerful applications, security personnel can use their smartphone not only to communicate with their colleagues but also to perform level 2 or even level 3 security inspections.

According to a first aspect, the invention relates to a method for authenticating a secure document comprising data printed by analogue or digital printing, said method comprising the following operations:

defining, among a set of graphic and/or alphanumeric data of the secure document, at least one distinct data zone including at least one distinctive pattern;

during an operation to manufacture the secure document, storing the distinct data zone on a storage device so as to form a reference distinct data zone;

during an operation to verify the authenticity of the secure document, extracting the distinct data zone from a digitisation of the secure document; and comparing the extracted distinct data zone with the reference distinct data zone in order to determine a level of concordance between said distinct data zones and to deduce from same a positive or negative authentication.

According to one aspect, the invention relates to a method for authenticating a secure document comprising data printed by analogue or digital printing, said method comprising the following operations:
- defining among a set of graphic and/or alphanumeric data of the secure document, at least one distinct and generic data zone including at least one distinctive pattern;
- during an operation to manufacture the secure document, storing a distinct data zone on a storage device so as to form a reference distinct data zone for an entire production of secure documents;
- during an operation to verify the authenticity of the secure document, extracting a distinct data zone from a digitisation of the secure document; and
- comparing the extracted distinct data zone with the stored reference distinct data zone in order to determine a threshold concordance level that is predefined and considered to be an acceptable level between said distinct data zones and to deduce from same a positive or negative authentication.

This authentication method allows a level 2 or level 3 inspection of a secure document without needing any tool other than a smartphone. It also makes it possible to authenticate a document without requiring any additional secure data to be added to said document.

In the present description, the expression "secure document" or "identity document" means a document comprising secure data that are optionally specific to the holder of the document. A secure document can be, for example, an identity card, a passport, a driving licence or any other document that is personalised as a function of the identity of the holder and issued specifically for the holder.

Advantageously, the operation to define at least one distinct and generic data zone for all the secure documents comprises selecting complex lines or shapes collected from a print file and offering specific features or a process of colour separation and halftoning of said distinct data zone. This process does not affect the rules for carrying out the secure printing in order to obtain a fusing of layers during the lamination step for a polycarbonate document, thus preventing any separation or delamination of said layers by a forger.

Advantageously, the manufacturing operation comprises an operation to print, on a substrate, all the graphic and alphanumeric data, including the reference distinct data zone.

If need be, for example as in the case of a polycarbonate identity document, the manufacturing operation can also comprise an operation to laminate the printed substrate with a plurality of layers of materials in order to constitute the secure document.

According to certain embodiments, the printing is offset printing.

According to certain embodiments, the step of storing the reference distinct data zone is carried out after printing all the graphic and alphanumeric data and a first digitisation of the secure document.

According to one variant, the manufacturing operation comprises a step of calibrating the reference distinct data zone and of generating a corrected print file integrating the reference distinct data zone and the printing and/or lamination noise, a flow of material and/or colour variations resulting from the analogue or digital printing. This variant makes it possible to store a reference distinct data zone corresponding to the distinct data zone as it was actually printed.

According to certain embodiments, the step of storing the reference distinct data zone is carried out before printing all the graphic and alphanumeric data.

According to one or more embodiments, the step of digitising the secure document during the operation to verify the secure document consists in taking a scan or a photograph of said secure document.

According to certain embodiments, the reference distinct data zone is recorded on a secure chip.

According to certain embodiments, the reference distinct data zone is recorded on a remote server.

According to one or more embodiments, the extraction of the distinct data zone during the operation to verify the secure document comprises an operation to collect, on said digitised document, the distinct data zone corresponding to the reference distinct data zone.

According to one variant, the collection operation comprises an image-processing step of registering the collected distinct data zone with the reference distinct data zone.

Advantageously, the distinct data zone as digitised is converted into a pixel format.

According to one or more embodiments, the operation to compare the reference distinct data zone with the extracted distinct data zone comprises estimating a score based on a distance between each point of the pattern of the extracted distinct data zone and a corresponding point of the pattern of the reference distinct data zone.

According to a second aspect, the invention relates to a system for authenticating a secure document comprising at least:
- an analogue or digital printing device for printing the secure device,
- a device for digitising the secure document; and
- a data-processing device comprising a set of instructions that prompt said device to perform the authentication method defined above.

The analogue printing device can be an offset, flexographic or other analogue printing device. The digital printing device can be an inkjet, laser or other digital printing device.

Advantageously, the device for digitising the secure document is a camera built into a smartphone.

According to a third aspect, the invention relates to a secure document comprising at least one surface provided with a set of graphic and/or alphanumeric data printed by a printing process, characterised in that the set of printed data comprises a distinct data zone stored and able to be authenticated by the authentication method defined above.

Advantageously, the secure document comprises a secure chip in which the reference distinct data zone is stored.

BRIEF DESCRIPTION OF THE FIGURES

Further advantages and features of the invention will appear from reading the description, illustrated by the figures in which.

DETAILED DESCRIPTION OF AT LEAST ONE EMBODIMENT

An embodiment of a method for authenticating a secure document—for example an identity card—with security level 2 is described in detail hereunder, in reference to the appended drawings. This example shows the features and advantages of the invention. It is noted however that the invention is not limited to this example.

In the figures, identical elements are marked with identical references. To ensure the readability of the figures, the elements are not all shown on the same scale.

Figure 4:
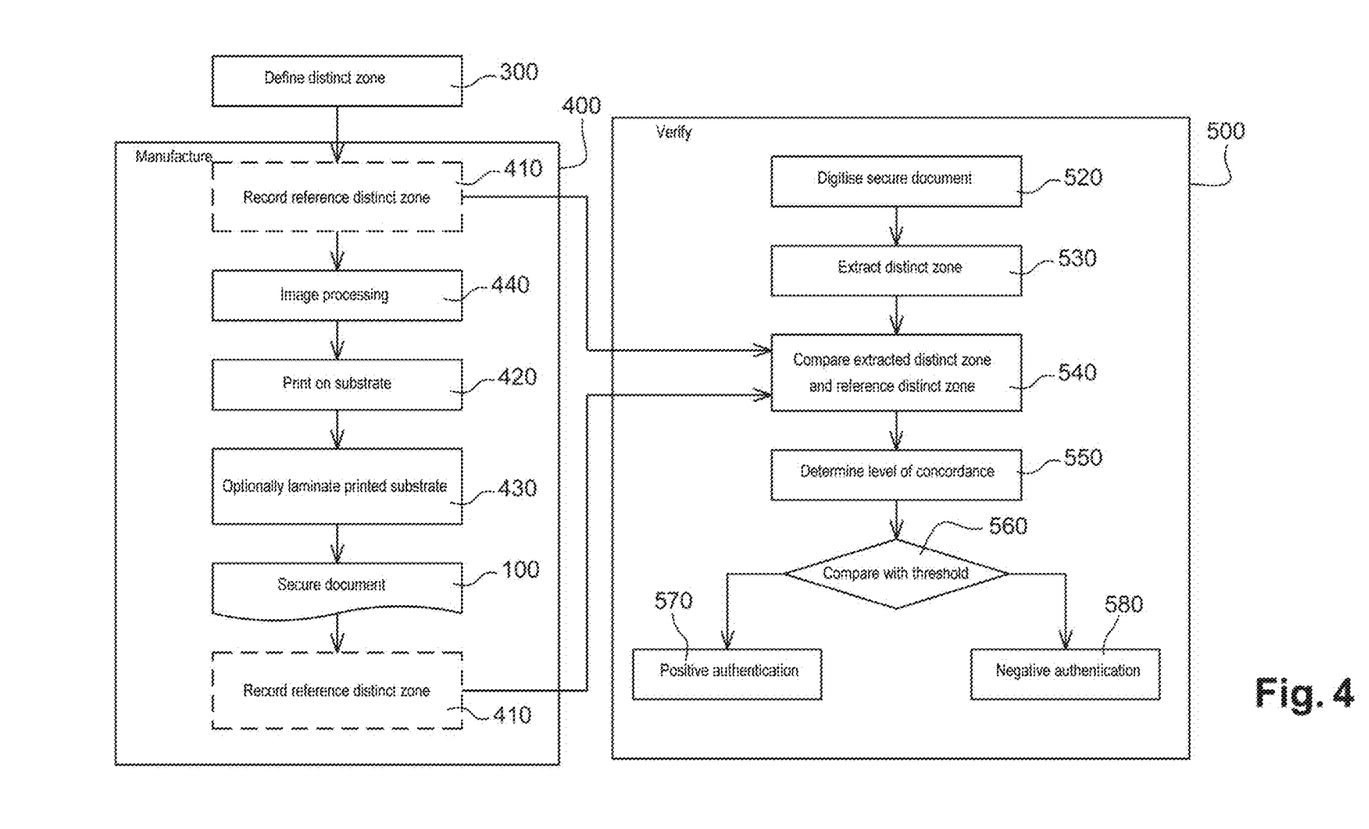
FIG. 4 shows, in the form of a function chart, an example of the authentication method of the invention.
Figure 5:
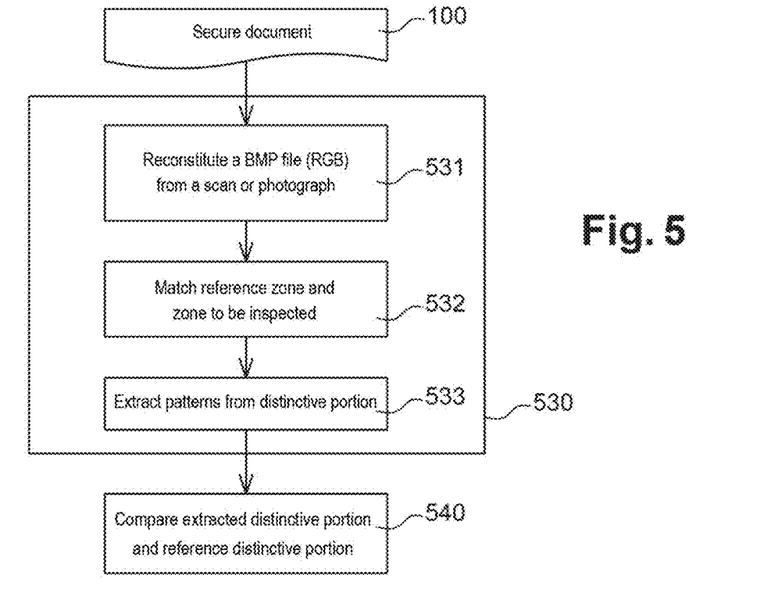
FIG. 5 shows, in the form of a function chart, an embodiment of the extraction procedure in the method of the invention.

An example of the various steps of the authentication method according to the invention is shown in FIG. 4. This method comprises a first operation to define 300 at least one distinctive portion 200 of the data of the secure document. This distinctive portion 200 is generic in all the secure documents. This operation 300 proposes selecting, in the set of initial data provided for being printed on the secure document, one or more distinctive portions intended for constituting a reference for a future generic comparison. This distinctive portion 200, also referred to as distinct data zone or distinct zone, comprises alphanumeric data, graphic data, guilloches, the photograph of the holder or any other characters or drawings intended for being printed on the secure document. This distinctive portion 200 is a data zone selected among all the graphic and alphanumeric data of the secure document. The selected data, also referred to as patterns or distinctive patterns, can be data specific to the holder or else any data printed on the secure document. For example, a data zone can be selected when it comprises thin lines, specific sets of points, a specific position or colour, etc. Every identity card or secure document comprises a data zone that is particular enough to constitute a distinctive portion. When the selected data are specific to the holder, they can be processed in order to determine a possible forgery of the document. When the selected data are not specific to the holder, they can be processed in order to determine whether the document is a counterfeit document manufactured by a counterfeiter.

Figure 3A:
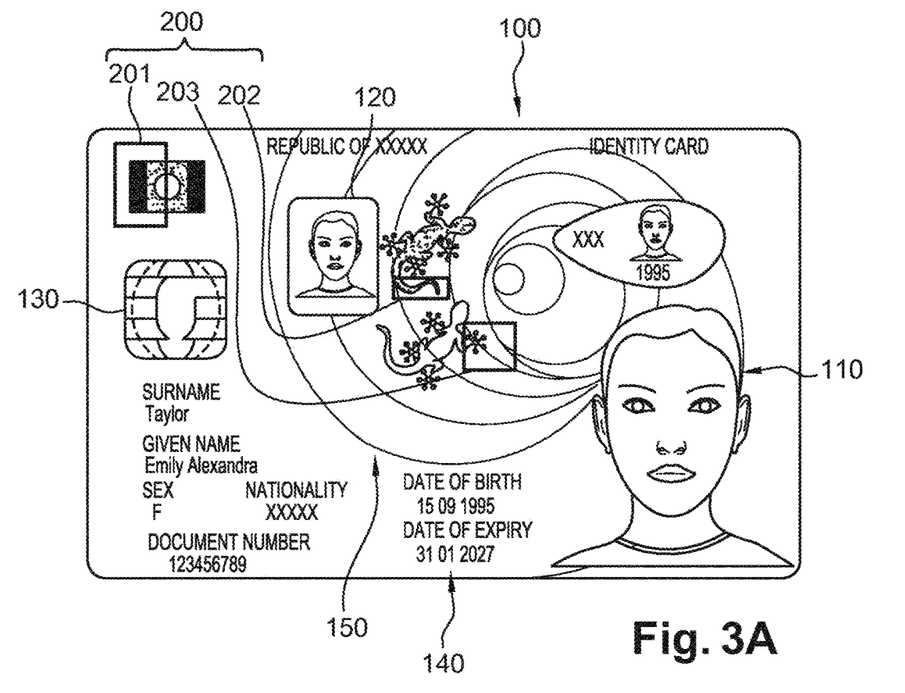
FIGS. 3A-3B show an example of a secure document, front and back, with a distinct data zone.
Figure 3B:
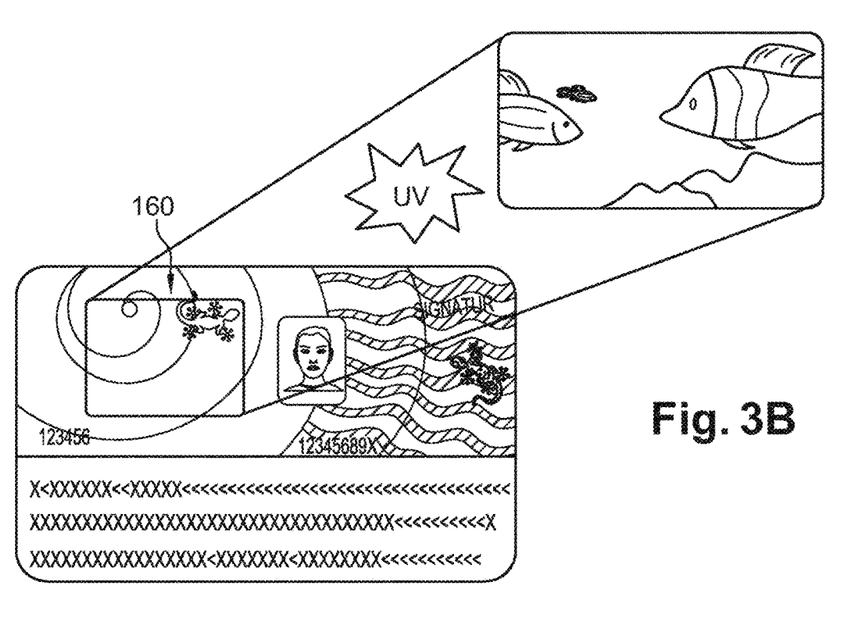

An example of an identity card 100 produced according to the method of the invention is shown in FIGS. 3A and 3B. This identity card 100, like most modern identity cards, comprises a plurality of security elements. It comprises, for example, on its front (FIG. 3A), alphanumeric data 140 relative to the holder of the card, a photograph 110 of the holder as well as a representation 120, for example in the form of an engraved or printed patch, of this same photograph 110. The identity card 100 can likewise comprise guilloches 150, a secure chip 130 and/or any other security element. In the example of FIG. 3B, the identity card 100 comprises, on its rear, a high-resolution secure colour image 160, visible under UV light, for example at 365 nm. This secure image 160 is produced by halftoning as shown in the enlarged image of FIG. 6. It provides distinctive zones for carrying out the method.

In the example of FIGS. 3A-3B, the distinctive portion selected for carrying out the method of the invention can be the zones with references 201, 202 and/or 203, for example. These zones 201-203 each comprise a large amount of graphic data, optionally coloured, such as guilloches or portions of guilloches, lines or portions of lines, drawings or portions of drawings, or any other distinctive graphic data. For example, zone 201 comprises a portion of the representation of the flag of the country from which the holder originates and a portion of coloured curved lines; zone 202 comprises a portion of a coloured gecko (for example its tail) and a portion of lines in the form of a coloured spiral; zone 203 comprises a portion of another coloured gecko (for example its leg) and another portion of the coloured spiral. Regardless of the distinctive portion 200 chosen, it must be a very particular zone of the identity card, preferably with a plurality of colours and a plurality of types of graphics, for example such as an ink-rich zone (for example, the gecko or the flag) and an area with thin lines (for example, the spiral or the guilloches).

When the secure document does not have sufficiently high-contrast characteristic zones, one variant of the invention suggests adding minimal distortions to a chosen zone in order to generate a specific signature. The characteristic zone and characteristic elements of this zone (number of intersection points of the guilloches, number of RGB or CMY coloured points, etc.) are recorded to form the distinctive portion that is generic to all the secure documents.

The authentication method of the invention comprises, after the selection operation 300, a set 400 of operations that allow the manufacturing of the secure device and a set 500 of operations that allow the verification of said secure document.

The manufacturing operations 400, carried out by the manufacturer of secure documents, comprise an operation 410 to record the distinctive portion 200. Indeed, once the distinctive portion has been selected, it is stored on a suitable storage device. The selected distinctive portion considered to be the reference is the same for the entire production of secure documents. This reference is stored on the suitable storage device. The storage device can be the secure chip 130 of the secure document. The distinctive portion that serves as reference is thus recorded on the actual secure document, so that it can be read with any smart card reader. The storage device can likewise be a central server to which the security personnel can connect remotely using any type of remote connection.

The storage 410 of the distinctive portion 200 can be carried out at the start of the operations 400 to manufacture the secure document, i.e. directly after the operation 300 to select said distinctive portion. In another embodiment described below, the distinctive portion can be recorded later, at the end of the operations 400 to manufacture the secure document. The two embodiments appear simultaneously in dotted lines in FIG. 4, it being understood that only one storage operation is carried out during the manufacturing of the secure document.

The secure document is then printed according to a known digital or analogue printing technique such as offset printing. This printing operation 420 comprises the production of a computer-to-plate printing plate, followed by the printing, on a predefined substrates—for example such as a polycarbonate substrate—of all the graphic and alphanumeric data of the secure document. In certain embodiments, for example when the identity document is made of polycarbonate, the manufacturing operation can comprise a lamination operation 430 which consists, after printing the substrate, in laminating said printed substrate with one or more layers of different materials. A personalisation operation—with the addition of a photograph and personal data of the holder—then makes it possible to obtain the secure document 100. The secure document 100 thus contains all the graphic and alphanumeric data relative to the holder and to the state emitting the secure document; it contains, among these data, the selected distinctive portion 200. A person skilled in the art will note that this distinctive portion 200 is not discernible on the physical document and its content can only be known from the recording of said distinctive portion. The recording of the distinctive portion, which is kept secret, does not lead to any modifications of the secure document and its conventional manufacturing method.

The verification operations 500, required by the security personnel, comprise first of all an operation 520 to digitise the secure document in its physical form. This digitisation can be carried out by the security personnel, for example, by scanning the secure document or else by taking a photograph of said secure document. This digitisation operation can be carried out, in certain embodiments, by means of a smartphone camera.

The method next comprises an operation 530 to extract the distinctive portion. The extracted distinctive portion is then compared, pixel-by-pixel, with the reference distinctive portion recorded on the remote server or on the secure chip (step 540 of FIG. 4). At the end of this comparison, a level of concordance is determined in step 550. A comparison (step 560) of this calculated level of concordance with a threshold level of concordance, that is predefined and considered to be an acceptable level, makes it possible to determine whether the authentication is positive (step 570) or negative (step 580). A positive authentication means that the secure document is considered to be authenticated. Conversely, a negative authentication means that the secure document is considered to be unauthenticated, for example counterfeit or forged. These operations to extract, compare and determine the level of concordance can be carried out by a smartphone, via an application installed on said smartphone or a remote computer connected to said smartphone.

As mentioned above, according to one embodiment, the distinctive portion 200 selected as reference is a digital data zone chosen in the set of graphic and alphanumeric data intended for being printed. The distinctive portion is thus stored before offset printing. This embodiment enables a very precise selection of the data intended to form the distinctive and generic portion 200.

According to another embodiment, the distinctive portion 200 selected as reference is an analogue data zone chosen in the secure document after printing. In this embodiment, the secure document is scanned immediately after printing and the distinctive portion 200 is selected in the scan of the document. The distinctive portion 200 which thus comprises digital data from the analogue document is stored at the end of the manufacturing operations 400, after the secure document 100 has been produced. This embodiment has the advantage of taking into account the noise introduced by printing and lamination. Indeed, any printing operation, whether analogue or digital, and offset printing in particular, can generate certain minor differences, referred to as noise, between the initial digital data provided to be printed and the analogue data obtained after printing. Likewise, the lamination operation can also generate noise. The fact of scanning the secure document immediately after printing makes it possible to take into account this noise so as to allow a more precise level of concordance during the comparison of the distinctive portion extracted during the verification and the reference distinctive portion. In one variant, the distinctive portion 200 can be defined before printing the secure document, but recorded after having been scanned. It is thus the scan of the selected distinctive portion that is stored as reference distinctive portion.

Figure 6:
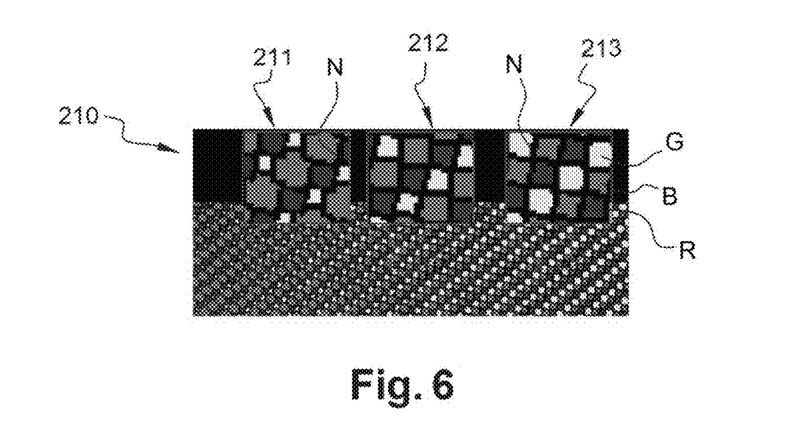
FIG. 6 shows an enlarged example of a portion of a halftone image that is suitable in particular for implementing the method of the invention.

In certain embodiments, the manufacturing operations 400 comprise, prior to the printing operation 420, an image-processing operation 440 which consists of transforming the data of the selected distinctive portion in order to form an image that is visible under ultraviolet radiation (UV). One example of such an image-processing step is described, in particular, in applications U.S. Pat. No. 8,085,438 B2 and EP 2 158 090 B1. This method consists, at least on the reference distinctive portion 200, in colour separation and halftoning, using an algorithm based on mapping the colour range (or gamut) and on the juxtaposition of the halftones. One example of an image portion obtained with this method is shown in FIG. 6. This image portion 210 comprises a plurality of red R, green G and blue B points, juxtaposed next to one another. These colour points are points with variable dimensions made with red, green and/or blue ink. As shown in the enlarged portions 211-213 of the image 210, all the colour points are set apart from one another, separated by neutral zones, i.e. zones without ink. These distant pixels are arranged so that the human eye cannot discern separated points and instead integrates these colour points so as to perceive continuous patterns and colour tones.

Thus, during the lamination operation 430, under the effect of the temperature and the pressure, the various layers of material fuse together and in particular fuse with the neutral zones. Indeed, unlike the R, G, B colour points which contain ink that has the effect of limiting the bonding of the layers to one another, the neutral zones allow strong bonding of said layers to one another. The performance of such an image-processing step, when the printing substrate is made of polycarbonate, requires for the ink coverage to be lower than or equal to 40% in order to allow correct fusing of the layers. With such a processing step, the various layers at the neutral zones cannot be delaminated or separated by a counterfeiter. A counterfeiter seeking to modify the data printed on the inner layers of the secure document would not be able to delaminate these inner layers, for example the printed substrate, without destroying the entire secure document.

Moreover, when this method for creating an image is carried out on the entire set of graphic and alphanumeric data, the secure document is obtained with a glossy, high-contrast colour rendering.

Regardless of how the reference distinct zone is recorded (before printing or after printing), the distinctive portion extracted in step 530 is compared with the recorded reference distinctive portion. The extracted distinctive portion is obtained by collecting, from the scan or the photograph of the secure document, the zone corresponding to the reference distinct zone. A digital form of the distinctive portion 200 as printed on the secure document 100 is thus obtained. The operation to collect the distinct zone from the digitised document can be completed by an operation to process the digitised image in order to register, if need be, the distinct zone to be collected with respect to the reference distinct zone. This registration can be carried out, in angular and dimensional terms, in an orthonormal frame of reference. The distinct zone thus collected, and optionally processed, constitutes the extracted distinct zone or extracted distinctive portion.

Since the extracted distinctive portion and the reference distinctive portion are both in digital form, they can be compared point-by-point with one another, i.e. pixel-by-pixel.

According to certain embodiments, the reference distinctive portion is stored in a digital format such as PDF or JPEG. This reference distinctive portion is then converted into pixels, for example in a BMP format, by any known conversion tool. Likewise, the extracted distinctive portion is converted into pixels, in the same format as the reference distinctive portion. In order to convert the extracted distinctive portion, one embodiment suggests converting the entire digitised secure document and then collecting only the chosen zone, namely the zone corresponding to the distinctive portion. Another embodiment suggests first collecting the distinctive portion and then converting only this collected distinctive portion.

A scaling operation may be required in order for the extracted distinctive portion and the reference distinctive portion to be on the same scale. When the two distinctive portions, extracted and reference, are on the same scale, they can be compared pixel-by-pixel by superimposing the two distinctive portions.

As shown in FIG. 4, the operation 540 to compare the extracted distinctive portion with the reference distinctive portion can be carried out by means of an algorithm which compares, pixel-by-pixel, the two distinctive portions so as to list the differences between two points at two similar locations on the reference distinctive portion and the extracted distinctive portion.

This pixel-by-pixel comparison can be carried out by a matching process in which a sample of several pixels is collected in the reference distinctive portion and moved over the extracted distinctive portion until the sample is registered, i.e. until it coincides with the extracted distinctive portion. Registration or alignment refers to the position of the sample that offers the highest level of consistency. When this registration position is determined, an orthonormal frame of reference XY is positioned and stored as a function of this position.

In the embodiments in which the distinctive portion is obtained by the process of colour separation and halftoning, the frame of reference XY can be inserted into the neutral zone separating the various ink points.

In certain embodiments, test patterns can be installed inside the artwork in order to facilitate the registration of the sample of pixels during the extraction.

An operation to find the differences is then carried out over the entire distinctive portion, taking XY as a frame of reference. The search for differences can be carried out pixel-by-pixel or pixel-pattern-by-pixel-pattern, each pixel pattern being able to comprise from two to several pixels. At the end of each comparison of pixels or patterns of pixels, a distance between the location of the pixel of the reference distinctive portion and the location of the pixel of the extracted distinctive portion is calculated. The calculation of the distances of all the pixels or patterns of pixels makes it possible to determine a level of concordance between the reference distinctive portion and the extracted distinctive portion (step 550 in FIG. 4).

In other words, the search for differences can rely on the estimation of a score calculated for each pair of pixels or pattern of pixels, a pair of pixels or pattern of pixels consisting of one pixel or one pattern of the extracted distinctive portion and one pixel or pattern of the reference distinctive portion. This operation to estimate the score can be obtained by calculating, at each point of an orthonormal frame of reference, the distance separating the pattern of the extracted portion and the pattern of the reference portion. Thus, in the orthonormal frame of reference XY, the score at a point x of the X axis corresponds to the distance along the Y axis between the pattern of the extracted portion and the pattern of the reference portion. This distance can be calculated as a number of pixels. The scores calculated at each point of the X axis, for a pair of pixels or patterns, are accumulated to constitute the score of the pixel or pattern of the extracted portion. The lower the score, the closer the pixel or pattern of the extracted distinctive portion will be to the pixel or pattern of the reference distinctive portion. This score defines the level of concordance between the two distinctive portions.

Regardless of how it is carried out, the comparison between the two distinctive portions makes it possible to determine whether or not the differences between the two documents are considerable. If the secure document has been forged or is counterfeit, then the differences will be considerable. If the secure document is the original, then the differences are minimal. Indeed, although differences may exist since the distinctive portion extracted is taken from a photograph or a scan made with an apparatus which may not have excellent definition, the differences will be minor enough to determine that it is the original.

In the embodiment of FIG. 4, the operation 560 makes it possible to compare the level of concordance determined in step 550 with a threshold level. The threshold level of concordance, i.e. the level that is considered to be acceptable, can be predefined as a function of criteria that are specific to the security service in question. It can also be modulated as a function of various external factors such as, for example, administrative or political factors. The level of concordance determined is thus compared with the threshold level of concordance in order to deduce whether or not the secure document inspected is fraudulent. If the level of concordance determined is lower than the threshold level, then a message for the attention of the security personnel is displayed which stipulates that the authentication is negative. Conversely, if the level of concordance determined is higher than or equal to the threshold level, then the message to the attention of the security personnel stipulates that the authentication is positive.

A person skilled in the art will understand that this authentication method has the advantage of not requiring any additional personalisation data to be added to the secure document. Only the data initially provided are selected to allow the performance of the authentication method according to the invention. The secure document does not undergo any modification. Only data-processing steps are added upstream of the production of the secure document and during the inspection of said document.

Although described through a certain number of examples, variants and embodiments, the authentication method according to the invention comprises several variants, modifications and improvements that are obvious for a person skilled in the art, and these variations, modifications and improvements are understood to be part of the scope of the invention.

The invention claimed is:

1. A method for authenticating a secure document comprising data printed by analogue or digital printing, said method comprising the following operations:
    defining, among a set of graphic and/or alphanumeric data of the secure document, at least one distinct and generic data zone including at least one distinctive pattern;
    during an operation to manufacture the secure document:
        storing a distinct data zone on a storage device so as to form a reference distinct data zone for an entire production of secure documents; and
        printing, on a substrate, all the graphic and alphanumeric data including the reference distinct data zone;
    wherein the step of storing the reference distinct data zone is carried out before printing all the graphic and alphanumeric data;

during an operation to verify the authenticity of the secure document, extracting a distinct data zone from a digitisation of the secure document; and comparing the extracted distinct data zone with the stored reference distinct data zone in order to determine a predefined threshold concordance level which is considered to be an acceptable level between said distinct data zones and to deduce from same a positive or negative authentication.

2. The method according to claim 1, wherein the operation to define at least one distinct data zone comprises selecting complex lines or shapes collected in a print file and offering specific features.

3. The method according to claim 1, wherein the operation to define at least one distinct data zone comprises a process of colour separation and halftoning of said distinct data zone.

4. The method according to claim 1, wherein the manufacturing operation comprises an operation to laminate the printed substrate with at least one layer of material in order to form the secure document.

5. The method according to claim 1, wherein the printing is offset printing.

6. The method according to claim 1, wherein the step of storing (410) the reference distinct data zone is carried out after printing all the graphic and alphanumeric data and a first digitisation of the secure document.

7. The method according to claim 6, wherein the manufacturing operation comprises a step of calibrating the reference distinct data zone and of generating a corrected print file integrating the reference distinct data zone and printing and/or lamination noise, a flow of material and/or colour variations resulting from the analogue or digital printing.

8. The method according to claim 1, wherein the step of digitising the secure document (100) during the operation to verify (500) the secure document consists of a scan or a photograph of said secure document.

9. The method according to claim 1, wherein the reference distinct data zone is recorded on a secure chip.

10. The method according to claim 1, wherein the reference distinct data zone is recorded on a remote server.

11. The method according to claim 1, wherein the step of extracting the distinct data zone during the operation to verify the secure document comprises an operation to collect, on said digitised document, the distinct data zone corresponding to the reference distinct data zone.

12. The method according to claim 11, wherein the collection operation comprises an image-processing step of registering the collected distinct data zone with the reference distinct data zone.

13. The method according to claim 11, wherein the distinct data zone as digitised is converted into a pixel format.

14. The method according to claim 1, wherein the operation to compare the reference distinct data zone with the extracted distinct data zone comprises estimating a score based on a distance between each point of the pattern of the extracted distinct data zone and a corresponding point of the pattern of the reference distinct data zone.

15. A system for authenticating a secure document comprising at least:
a printing device for printing the secure device,
a device for digitising the secure document; and
a data-processing device comprising a set of instructions to cause the data-processing device to:
define, among a set of graphic and/or alphanumeric data of the secure document, at least one distinct and generic data zone including at least one distinctive pattern;
during an operation to manufacture the secure document:
store a distinct data zone on a storage device so as to form a reference distinct data zone for an entire production of secure documents; and
print, on a substrate, all the graphic and alphanumeric data including the reference distinct data zone:
wherein the step of storing the reference distinct data zone is carried out before printing all the graphic and alphanumeric data:
during an operation to verify the authenticity of the secure document, extract a distinct data zone from a digitisation of the secure document; and
compare the extracted distinct data zone with the stored reference distinct data zone in order to determine a predefined threshold concordance level which is considered to be an acceptable level between said distinct data zones and to deduce from same a positive or negative authentication.

16. The authentication system according to claim 15, wherein the digitising device is a camera built into a smartphone.

17. The system according to claim 15, wherein the secure document further comprises a secure chip in which the reference distinct data zone is stored.

* * * * *